(12) United States Patent
Frolikov

(10) Patent No.: US 10,489,085 B2
(45) Date of Patent: Nov. 26, 2019

(54) LATENCY-BASED SCHEDULING OF COMMAND PROCESSING IN DATA STORAGE DEVICES

(71) Applicant: Micron Technology, Inc., Boise, ID (US)

(72) Inventor: Alex Frolikov, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 47 days.

(21) Appl. No.: 15/908,261

(22) Filed: Feb. 28, 2018

(65) Prior Publication Data

US 2019/0265909 A1 Aug. 29, 2019

(51) Int. Cl.
*G06F 3/06* (2006.01)
*G06F 13/18* (2006.01)
*G06F 13/16* (2006.01)

(52) U.S. Cl.
CPC ........ *G06F 3/0659* (2013.01); *G06F 13/1642* (2013.01); *G06F 13/18* (2013.01); *G06F 3/0679* (2013.01)

(58) Field of Classification Search
CPC .... G06F 3/0659; G06F 13/1642; G06F 13/18; G06F 3/0679
See application file for complete search history.

(56) References Cited

U.S. PATENT DOCUMENTS

| | | | |
|---|---|---|---|
| 6,898,653 B2 | 5/2005 | Su et al. | |
| 8,799,561 B2* | 8/2014 | Bux | G06F 12/0246 365/185.33 |
| 8,904,072 B2 | 12/2014 | Lee | |
| 9,268,499 B1* | 2/2016 | Wilkins | G06F 3/068 |
| 2006/0184718 A1 | 8/2006 | Sinclair et al. | |
| 2008/0040818 A1* | 2/2008 | Iima | G06F 8/65 726/36 |
| 2008/0052506 A1* | 2/2008 | Iima | G06F 11/1417 713/1 |
| 2011/0283046 A1 | 11/2011 | Koseki | |
| 2014/0020083 A1 | 1/2014 | Fetik | |
| 2015/0186074 A1 | 7/2015 | Benisty et al. | |
| 2016/0124740 A1 | 5/2016 | Choi et al. | |
| 2017/0123667 A1 | 5/2017 | Richter et al. | |
| 2018/0173461 A1 | 6/2018 | Carroll et al. | |
| 2018/0196602 A1 | 7/2018 | Shin | |
| 2018/0336150 A1* | 11/2018 | Jinn | H04W 28/08 |

OTHER PUBLICATIONS

International Search Report and Written Opinion, PCT/US2019/014765, dated May 3, 2019.
"SDB:SSD Idle Time Garbage Collection support", https://en.opensuse.org/SDB:SSD_Idle_Time_Garbage_Collection_support, printed on Jan. 19, 2018.
"Write Amplification", Wikipedia, printed on Feb. 22, 2018.

* cited by examiner

*Primary Examiner* — Francisco A Grullon
(74) *Attorney, Agent, or Firm* — Greenberg & Traurig, LLP

(57) ABSTRACT

A computer system having a host coupled to a storage device via a peripheral component interconnect express bus. The host communicates write commands of low priority to the storage device, which places them in a queue for execution at an idle time. In response to a determination that the storage device is in an idle state, the storage device best accommodates the write commands in the idle queue in connection with housekeeping tasks, such as garbage collection and wear leveling, to best reduce write amplification.

16 Claims, 5 Drawing Sheets

LATENCY-BASED SCHEDULING OF COMMAND PROCESSING IN DATA STORAGE DEVICES

RELATED APPLICATIONS

The present application is related to U.S. patent application Ser. No. 15/893,249, filed Feb. 9, 2018 and entitled "Data Storage Device Idle Time Processing", the entire disclosure of which is hereby incorporated herein by reference.

FIELD OF THE TECHNOLOGY

At least some embodiments disclosed herein relate to computer storage devices in general and more particularly but not limited to solid state drives (SSDs).

BACKGROUND

Typical computer storage devices, such as hard disk drives (HDDs), solid state drives (SSDs), and hybrid drives, have controllers that receive data access requests from host computers and perform programmed computing tasks to implement the requests in ways that may be specific to the media and structure configured in the storage devices, such as rigid rotating disks coated with magnetic material in the hard disk drives, integrated circuits having memory cells in solid state drives, and both in hybrid drives.

A standardized logical device interface protocol allows a host computer to address a computer storage device in a way independent from the specific media implementation of the storage device. For example, Non-Volatile Memory Host Controller Interface Specification (NVMHCI), also known as NVM Express (NVMe), specifies the logical device interface protocol for accessing non-volatile storage devices via a Peripheral Component Interconnect Express (PCI Express or PCIe) bus.

Some erasable computer storage media, such as Compact Disc-ReWritable, DVD recordable, DVD-RAM, electrically erasable programmable read-only memory (EEPROM), and/or flash memory, have useful service periods limited by the cycles of program and erase to store data. An erasure operation is performed to clear or erase the existing data stored in a memory unit; and a programming operation is performed to store, write, or program new data into the memory unit.

A program erase (P/E) budget represents a predetermined number of cycles of program and erase that can be performed reliably for recording data in such an erasable medium. After the predetermined of cycles of erasure, the program erase (P/E) budget of such the erasable medium is used up; and as a result, the medium may become unreliable in a statistical sense and thus is considered at the end of its useful service life.

A solid state drive (SSD) typically has many memory units structured in the hierarchies of pages and blocks. A block of memory units has multiple pages of memory units. Different pages in a block can be independently programmed. However, different pages in a same block need to be erased together; and a page having been previously programmed needs to be erased before being programmed again to store new data.

When a block has some pages that are free to be programmed and some pages that have data to be modified, the solid state drive (SSD) may mark the pages that need to be modified as having invalid data, program free pages to store the modified data, and update the mapping between the logical addresses used by the host computer to identify data storage locations and the physical addresses of the memory units that actually store the data. To store data in pages that have invalid data, it is typically necessary to erase the pages by erasing the block as a whole, which would erase other blocks that have valid data.

When a block has some pages containing valid data and other pages containing invalid data, the valid data can be copied from the pages in the block to another location such that the entire block can be erased for programming. Such a process to erase pages containing invalid data and make them usable for storing new data is referred to as garbage collection.

The degree of wearing of each memory block is proportional to the number of erasure operations performed on the memory block. Wear leveling can be performed in a solid state drive such that the operations of erasure are distributed across the memory blocks in the solid state drive.

Garbage collection and/or wear leveling can lead to the movement of a data item programmed at one location to another in the storage device one or more times during the life cycle of a data item, causing multiple times of write operations of the data item. Such an effect is referred to as write amplification, which can reduce the useful life of the storage device.

BRIEF DESCRIPTION OF THE DRAWINGS

The embodiments are illustrated by way of example and not limitation in the figures of the accompanying drawings in which like references indicate similar elements.

DETAILED DESCRIPTION

A storage device according to at least some embodiments disclosed herein schedules certain tasks and commands for processing at an idle time. For example, the storage device performs predetermined housekeeping tasks at an idle time, such as garbage collection and/or wear leveling. For example, when a host marks a command for having a low priority, the storage device may schedule the command for execution at an idle time. In some instances, a host may optionally load add-on modules on the storage device to perform operations of customized commands; and the storage device schedules the customized commands for execution at an idle time. Preferably, the storage device accommodates the execution of the tasks and commands with best-effort and makes the best effort to minimize write amplification in idle time processing.

A storage device, such as a solid state drive (SSD), has a controller that is typically programmed via firmware to perform computations required for accessing the storage media in the storage device, such as converting logical addresses, used by a host to specify data access locations, to physical addresses of storage elements in the storage device.

In at least one embodiment disclosed herein, a storage device is customizable to offer to its host the computing power of its controller as a computational resource and to provide computation services when the storage device is at least partially in an idle state.

For example, add-on modules configured for execution by the controller of the storage device can be loaded in the storage device to enable customized commands from its host. The host may send customized commands to the storage device to request the storage device to perform computations invoked by customized commands and programmed using the add-on modules. The storage device executes, at an idle time, the customized commands using the computing power of the controller of the storage device and/or the data already stored in the storage device. The computation results are stored in the storage device for retrieval by the host after the storage device reports the completion of the execution of the customized commands. Thus, the storage device not only stores data for the host but also performs customizable data processing tasks according to the instructions, programs, and/or applications specified by the host.

Figure 1:
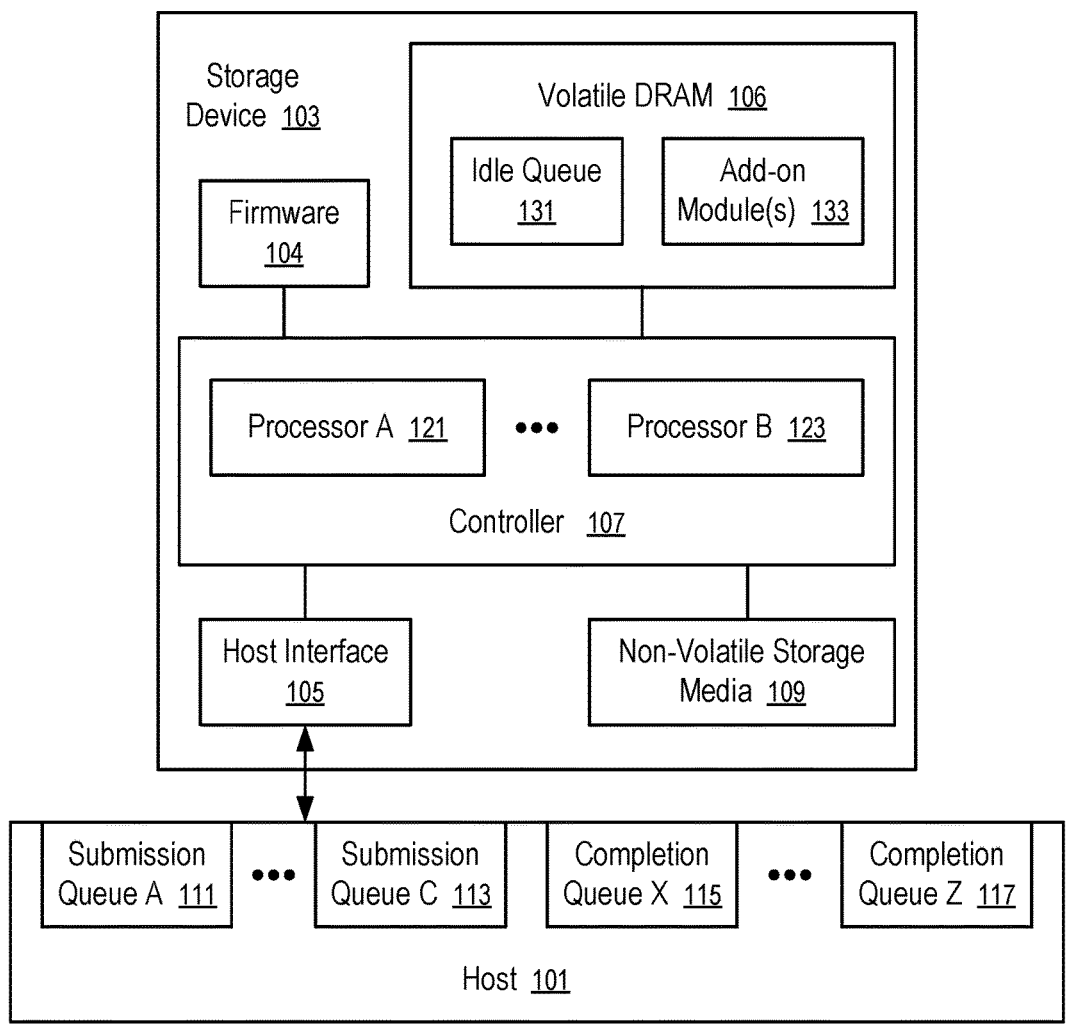
FIG. 1 shows a computer system configured to perform idle time processing in a storage device according to at some embodiments disclosed herein.

FIG. 1 shows a computer system configured to perform idle time processing in a storage device according to at some embodiments disclosed herein.

The computer system of FIG. 1 includes a storage device (103) attached to a host (101). The host (101) communicates add-on modules (133) to the storage device (103) and sends requests/commands implemented via, or programmed/defined by, the add-on modules (133) using submission queues (111, . . . , 113). The storage device (103) places the customized requests/commands in the idle queue (131) for execution at an idle time and executes other requests/commands before the idle time. When the storage device (103) has idle resources for the execution of the requests/commands in the idle queue (131), the storage device (103) loads the add-on module(s) (133), runs the requests/commands in the idle queue (131), and provides a response to a completion queue (115, . . . , or 117) associated with a submission queue (111, . . . , or 113) from which the requests/commands are received.

The add-on modules (133) can be provided as part of the firmware (104). During the update of the firmware (104), the add-on modules (133) are communicated to the storage device (103) and stored in the non-volatile storage media (109) (e.g., as part of the firmware (104)).

Alternatively, or in combination, the add-on modules (133) can be provided as data stored in the non-volatile storage media (109) via input/output requests. Since the requests/commands implemented using the add-on modules (133) are executed from the idle queue (131) during an idle time, the host (101) is allowed to provide the add-on modules (133) after submitting the requests/commands.

The firmware (104) may include an operating system (e.g., implemented via a version of Linux kernel, or Chromium OS). Optionally, the operating system included in the firmware (104) is an open source computer operation system that allows users of the computer system, or a third party, to develop applications, extensions, and/or apps as add-no modules (133).

The firmware (104) may include an application programming interface (API) that supports the development of applications, extensions, and/or apps using a computer programming language, such as a scripting language.

In one implementation, the storage device (103) has a controller (107) having multiple processors (121, . . . , 123). One of the processors (121, . . . , 123) is configured to run the operating system to process customized commands.

For example, the processor (121) may run an operating system that recognizes and queues customized commands in the idle queue (131), and manages the add-on modules (133). When the processor (121) is free of tasks for standard input/output operations (e.g., commands defined in the admin command set and in the NVM command set in an NVMe standard), the operating system loads the add-on modules (133) according to the needs of the requests/commands in the idle queue (131). When there are other input/output requests/commands waiting in any of the submission queues (111, . . . , 113), the operating system may pause the execution of the customized commands and/or the processing of commands from the idle queue (131) until the processor (121) is substantially idling again.

Further, the processor (121) may monitor the workloads of the other processors (e.g., 123) and dispatch requests/commands from the idle queue (131) to idling processors (e.g., 123).

In some implementations, an idle queue is implemented on the host (101) as a dedicated submission queue (e.g., 113) of commands to be processed at the idle time of the storage device (103). The commands placed in the submission queue (e.g., 113) may not be limited to customized commands that use the add-on modules (133). For example, a standard read or write command may be placed in the submission queue (e.g., 113) for execution at an idle time.

For example, a submission queue (113) is configured as a queue of commands for processing at the idle time of the storage device (103). The controller (107) of the storage device (103) does not fetch requests/commands from the submission queue (113) until at least one of the processors (121, . . . , 123) is in an idle state. The controller (107) of the storage device (103) fetches commands from the other submission queues (e.g., 113) until they are empty and the execution of the fetched commands/requests is completed. Further, the controller (107) may execute system idle tasks, such as Idle Time Garbage Collection in solid state drives, before entering an idle state.

For example, an add-on module (133) can be programmed to perform machine learning using the data stored in the non-volatile storage media (109).

For example, an add-on module (133) can be programmed to apply a filter to the data stored in the non-volatile storage media (109) to generate filtered data.

For example, an add-on module (133) can be programmed to convert the data stored in the non-volatile storage media (109) from one format to another.

For example, an add-on module (133) can be programmed to index and/or organize the data stored in the non-volatile storage media (109).

In some instances, when the non-volatile storage media (109) is shared by a plurality of accounts, the computer system may improve data security by creating multiple namespaces. Each account is assigned to access one or more namespaces for exclusive use by the account; and the data access made in the account is addressed using logical addresses defined in a namespace. The execution of the add-on module(s) (133) limits data access within the respective namespace(s) of the account from which the request/command in the idle queue (131) are received. The storage device (103) translates the logical addresses defined in the namespace(s) of the account to physical addresses in the non-volatile storage media (109).

Physical memory elements of a storage device can be arranged as logical memory blocks addressed via Logical Block Addressing (LBA). A logical memory block is the smallest LBA addressable memory unit; and each LBA address identifies a single logical memory block that can be mapped to a particular physical address of a memory unit in the storage device.

The concept of namespace for storage device is similar to the concept of partition in a hard disk drive for creating logical storage spaces. Different portions of a storage device (103) can be allocated to different namespaces and thus can have LBA addresses configured independently from each other within their respective namespaces. Each namespace identifies a quantity of memory of the storage device addressable via LBA. A same LBA address can be used in different namespaces to identify different memory units in different portions of the storage device. For example, a first namespace allocated on a first portion of the storage device having n memory units can have LBA addresses ranging from 0 to n−1; and a second namespace allocated on a second portion of the storage device having m memory units can have LBA addresses ranging from 0 to m−1.

The host (101) of the storage device (103) may send a request to the storage device (103) for the creation, deletion, or reservation of a namespace. After a portion of the storage capacity of the storage device is allocated to a namespace, an LBA address in the respective namespace logically represents a particular memory unit in the storage media, although the particular memory unit logically represented by the LBA address in the namespace may physically correspond to different memory units at different time instances (e.g., as in SSDs).

A block by block namespace map can be used in efficiently implementing the mapping of LBA addresses defined in multiple namespaces into physical memory elements in the storage device and in efficiently using the storage capacity of the storage device, especially when it is desirable to dynamically allocate, delete and further allocate on the storage device multiple namespaces with different, varying sizes.

For example, the portion of the storage capacity allocated to a deleted namespace may not be sufficient to accommodate the allocation of a subsequent namespace that has a size larger than the deleted namespace; and repeated cycles of allocation and deletion may lead to fragmentation of the storage capacity that may lead to inefficient mapping of LBA addresses to physical addresses and/or inefficient usage of the fragmented storage capacity of the storage device.

After a block by block namespace map translates LBA addresses defined in allocated namespaces to LBA addresses defined on the entire storage capacity of the storage device, the corresponding LBA addresses defined on the entire storage capacity of the storage device can be further mapped to the physical storage elements in a way independent of the allocations of namespaces on the device. When the block by block mapping of LBA addresses is based on a predetermined size block size, an efficient data structure can be used for the efficient computation of LBA addresses defined on the entire storage capacity of the storage device from the LBA addresses defined in the allocated namespaces.

For example, the entire storage capacity of the storage device can be divided into blocks of LBA addresses according to a predetermined block size for flexibility and efficiency in namespace management. The block size represents the number of LBA addresses in a block. The block by block namespace mapping from LBA addresses defined in allocated namespaces to LBA addresses defined on the entire storage capacity of the storage device allows the allocation of non-contiguous LBA addresses defined on the entire storage to a namespace, which can reduce fragmentation of the storage capacity caused by cycles of namespace allocation and deletion and improve efficiency in the usage of the storage capacity.

Further details and examples of block by block namespace mapping, linking namespaces and accounts, and secure data for each account via linking namespaces and crypto keys can be found in U.S. patent applicataion Ser. No. 15/876,066, filed Jan. 19, 2018 and entitled "Management of Storage Resources Allocated from Non-volatile Memory Devices to Users", the entire disclosure of which is hereby incorporated herein by reference.

The host (101) of FIG. 1 communicates with the storage device (103) via a communication channel having a predetermined protocol. In general, the host (101) can be a computer having one or more Central Processing Units (CPUs) to which computer peripheral devices, such as the storage device (103), may be attached via an interconnect, such as a computer bus (e.g., Peripheral Component Interconnect (PCI), PCI eXtended (PCI-X), PCI Express (PCIe)), a communication port, and/or a computer network.

The computer storage device (103) can be used to store data for the host (101). Examples of computer storage devices in general include hard disk drives (HDDs), solid state drives (SSDs), flash memory, dynamic random-access memory, magnetic tapes, network attached storage device, etc. The storage device (103) has a host interface (105) that implements communications with the host (101) using the communication channel. For example, the communication channel between the host (101) and the storage device (103) is a PCIe bus in one embodiment; and the host (101) and the storage device (103) communicate with each other using NVMe protocol.

In some implementations, the communication channel between the host (101) and the storage device (103) includes a computer network, such as a local area network, a wireless local area network, a wireless personal area network, a cellular communications network, a broadband high-speed always-connected wireless communication connection (e.g., a current or future generation of mobile network link); and the host (101) and the storage device (103) can be configured to communicate with each other using data storage management and usage commands similar to those in NVMe protocol.

The controller (107) of the storage device (103) runs firmware (104) to perform operations responsive to the communications from the host (101). Firmware in general is a type of computer program that provides control, monitoring and data manipulation of engineered computing devices.

In general, the non-volatile storage media (109) of the storage device (103) can be implemented as memory cells in an integrated circuit, or magnetic material coated on rigid disks. The storage media (109) is non-volatile in that no power is required to maintain the data/information stored in the non-volatile storage media (109), which data/information can be retrieved after the non-volatile storage media (109) is powered off and then powered on again. The memory cells may be implemented using various memory/storage technologies, such as NAND gate based flash memory, phase-change memory (PCM), magnetic memory (MRAM), resistive random-access memory, and 3D XPoint, such that the storage media (109) is non-volatile and can retain data stored therein without power for days, months, and/or years.

The storage device (103) includes volatile Dynamic Random-Access Memory (DRAM) (106) for the storage of run-time data and instructions used by the controller (107) to improve the computation performance of the controller (107) and/or provide buffers for data transferred between the host (101) and the non-volatile storage media (109). DRAM (106) is volatile in that it requires power to maintain the data/information stored therein, which data/information is lost immediately or rapidly when the power is interrupted.

Volatile DRAM (106) typically has less latency than non-volatile storage media (109), but loses its data quickly when power is removed. Thus, it is advantageous to use the volatile DRAM (106) to temporarily store instructions and data used for the controller (107) in its current computing task to improve performance. In some instances, the volatile DRAM (106) is replaced with volatile Static Random-Access Memory (SRAM) that uses less power than DRAM in some applications. When the non-volatile storage media (109) has data access performance (e.g., in latency, read/write speed) comparable to volatile DRAM (106), the volatile DRAM (106) can be eliminated; and the controller (107) can perform computing by operating on the non-volatile storage media (109) for instructions and data instead of operating on the volatile DRAM (106).

For example, cross point storage and memory devices (e.g., 3D XPoint memory) have data access performance comparable to volatile DRAM (106). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors, each having its own in-processor cache memory.

Optionally, the controller (107) performs data intensive, in-memory processing using data and/or the add-on modules (133) organized in the storage device (103). For example, in response to a request from the host (101), the controller (107) performs a real time analysis of a set of data stored in the storage device (103) and communicates a reduced data set to the host (101) as a response. For example, in some applications, the storage device (103) is connected to real time sensors to store sensor inputs; and the processors of the controller (107) are configured to perform machine learning and/or pattern recognition based on the sensor inputs to support an artificial intelligence (AI) system that is implemented at least in part via the storage device (103) and/or the host (101).

In some implementations, the processors of the controller (107) are integrated with memory (e.g., 106 or 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate, and decreases latency and power usage.

The storage device (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

At least some embodiments of the inventions disclosed herein can be implemented using computer instructions executed by the controller (107), such as the firmware (104). In some instances, hardware circuits can be used to implement at least some of the functions of the firmware (104). The firmware (104) can be initially stored in the non-volatile storage media (109), or another non-volatile device, and loaded into the volatile DRAM (106) and/or the in-processor cache memory for execution by the controller (107).

Optionally, the storage device (103) has a register that stores a crypto key of the namespace during data access performed in the namespace and/or in the account.

In at least some embodiments, the host (101) and the storage device (103) communicate with each other via message queues. For example, a submission queue can be used by the host (101) to submit requests to the storage device (103); and a completion queue can be used by the host (101) to receive responses from the storage device (103). For example, a version of NVMe (e.g., Non-Volatile Memory Host Controller Interface Specification 1.2) specifies the use of a circular buffer with a fixed slot size for a submission queue or a completion queue.

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage device (103), commands to write data into the storage device (103), commands to compare data in the storage device (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the controller (107) of the storage device (103) fetch the commands/requests from a submission queue according to the order in which the commands are placed in the submission queue. However, the NVMe allows the controller (107) to execute the fetched commands in any order.

In at least some embodiments disclosed herein, when a submission queue has a customized command (e.g., not a standard command defined in NVMe), the controller (107) places the customized command in the idle queue (131) for execution during idle time.

For example, the storage device (103) may process all of the I/O submission queues configured for the storage device (103) according to a round robin scheme, where the storage device (103) executes one command from a queue, or up to a predetermined number of commands, and then processes the next queue according to a predetermined queue order. After the submission queues (111, . . . , 113) are empty, the controller (107) processes the idle queue (131).

For example, the storage device (103) may randomly select a queue to execute a command (or up to a predetermined number of commands) and then randomly select the next queue for execution of a command (or up to the same predetermined number of commands). After the submission queues (111, . . . , 113) are empty, the controller (107) processes the idle queue (131).

For example, the storage device (103) may randomly select a queue for the execution of a random number of commands and then randomly select the next queue for execution of a random number of commands. After the submission queues (111, . . . , 113) are empty, the controller (107) processes the idle queue (131).

For example, the storage device (103) may randomly select a queue for the execution of a set of related commands in the queue and then randomly select the next queue for execution of a set of related commands. After the submission queues (111, . . . , 113) are empty, the controller (107) processes the idle queue (131).

Alternatively, or in combination, one or more submission queues (e.g., 111) are configured to submit commands for execution at idle time. The controller (107) completes the processing of other queues to enter an idle state in order to further processing the submission queues (e.g., 111) that is configured to submit commands for execution at idle time.

Figure 2:
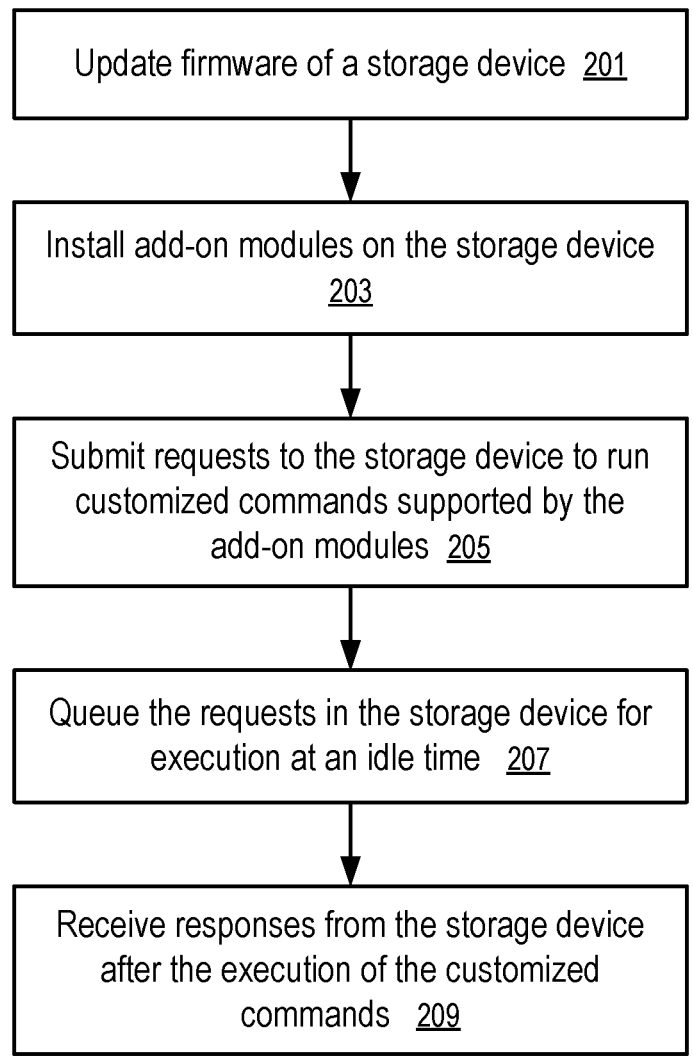
FIG. 2 shows a method to perform idle time processing.

FIG. 2 shows a method to perform idle time processing. For example, the method of FIG. 2 can be implemented in a computer system of FIG. 1.

The method of FIG. 2 includes: updating (201) firmware (104) of a storage device (103); installing (203) add-on modules (133) on the storage device (103) (e.g., via a firmware update and/or storing the module as data in the storage device (103)); submitting (205) (e.g., via submission queues (111, . . . , 113) requests to the storage device (103) to run customized commands that are supported by or programmed by the add-on modules (133); queuing (207) the requests in the storage device (103) (e.g., in the idle queue (131)) for execution at an idle time; and receiving (209) (e.g., via completion queues (115, . . . , 117) responses from the storage device (103) after the execution of the customized commands.

Figure 3:
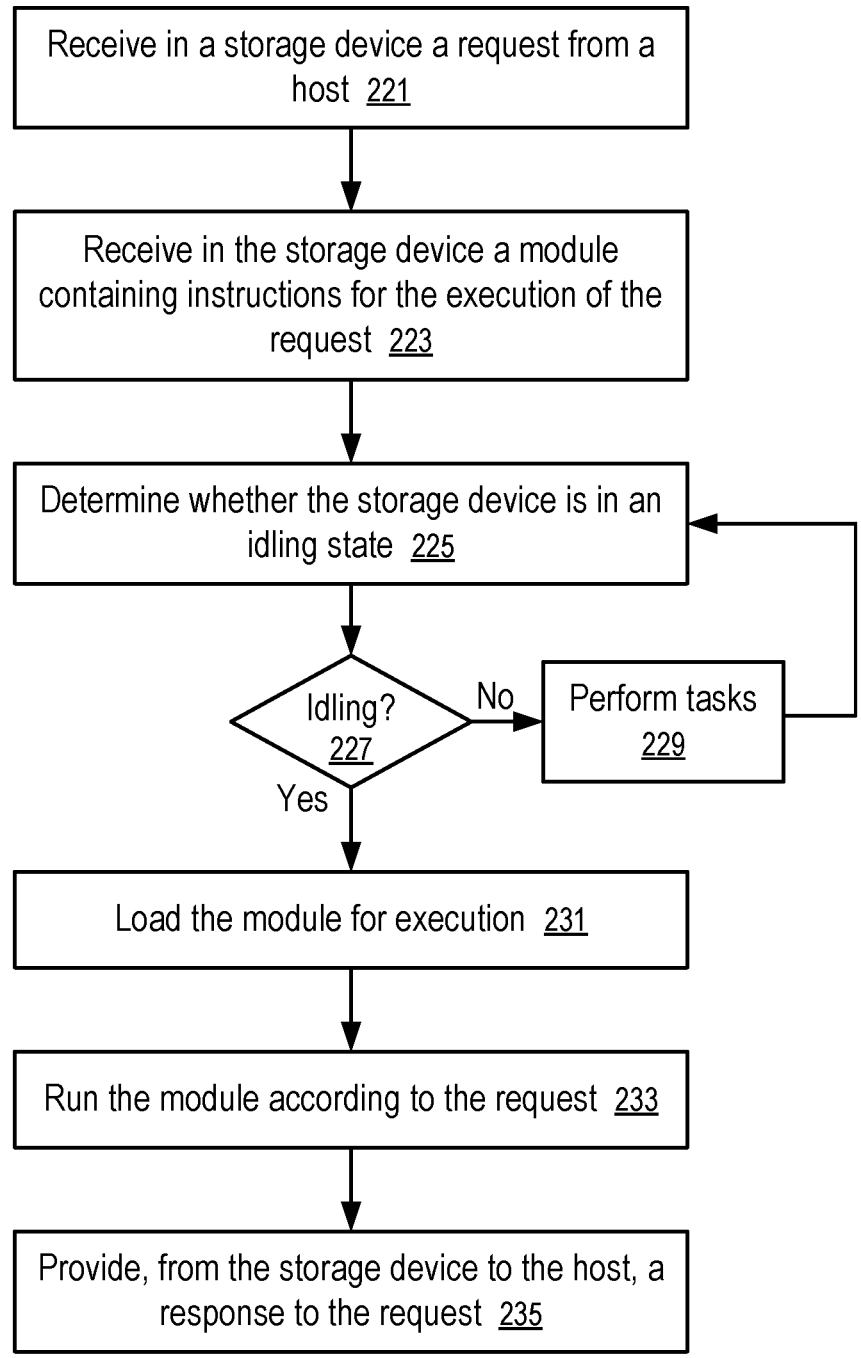
FIG. 3 shows another method to perform idle time processing.

FIG. 3 shows another method to perform idle time processing. For example, the method of FIG. 3 can be implemented in a computer system of FIG. 1.

The method of FIG. 3 includes: receiving (221) in a storage device (103) a request from a host (101); receiving (223) in the storage device (103) a module (133) containing instructions for the execution of the request; and determining (225) whether the storage device (103) is in an idling state (e.g., having completed non-customized commands and/or having completed idle time garbage collection)

If it is determined (227) that the storage device (103) is idling, the method of FIG. 3 further includes performing (229) tasks and further determining (227) whether the storage device (103) is idling; otherwise, the method of FIG. 3 further includes: loading (231) the module (133) for execution; running (233) the module (133) according to the request; and providing (235), from the storage device (103) to the host (101), a response to the request.

For example, a computer system (e.g., as illustrated in FIG. 1) has: a host (101); and a storage device (103) that is coupled to the host (101) via a communication bus (e.g., a peripheral component interconnect express bus). The storage device (103) has: a host interface (105) in communication with the host (101); a controller (107); non-volatile storage media (109); and firmware (104) containing instructions executable by the controller (107).

The host (101) transmits, to the storage device (103), a module (133) and a request to run the module (133). The module (133) and the request may be transmitted together in one submission, or separately. In response, the storage device (103) waits until storage device (103) is in an idle state in order to run the module (133) in accordance with the request.

The host (101) may communicate with the storage device (103) in accordance with a non-volatile memory host controller interface specification.

As an example, the storage device (103) is a solid state drive, where the command or request to run the module (133) is scheduled, by the controller (107) executing the firmware (103), for execution after the solid state drive completes idle time garbage collection.

The controller (107) of the storage device (103) may include a plurality of processors (121, . . . , 123), which may be separate microprocessors, or different processing cores packaged in a microprocessor. The firmware (104) may include an operating system running on one of the processors (121, . . . , 123) to recognize and schedule, in the idle queue (131), the execution of customized commands received via the submission queues (111, . . . , 113). The operating system manages the loading and unloading of the add-on modules (133).

For example, the operating system running on one of the processors (121, . . . , 123) configures an idle queue (131) in the volatile DRAM (106) of the storage device (103) to hold customized requests/commands fetched from the submission queues (111, . . . , 113) and schedules their execution at a time when the storage device (103) is in the idle state. Preferably, the idle state is reached after the submission queues (111, . . . , 113) are all empty, the requests/commands fetched from the submission queues (111, . . . , 113), other than those held in the idle queue (131), have all be completed, and/or routine idle processing tasks, such as idle time garbage collection for SSD, have all been completed.

The module (133) containing the instructions for performing operations a customized command can be communicated from the host (101) to the storage device (103) in various ways. For example, the module (133) can be communicated to the storage device (103) as a firmware update submitted via an admin submission queue, communicated to the storage device (103) as part of the request/command sent via the I/O submission queue, or communicated to the storage device (103) as a request/command to store data in the non-volatile storage media (109) via an I/O submission queue where the stored data includes the module (133). The I/O request/command to store the module (133) in the non-volatile storage media (109) can be separate from the I/O request/command that uses of the module (133) and can be submitted using the same queue as, or another queue different from, the I/O submission queue that is used to submit the I/O request/command that uses of the module (133).

As an alternative to maintaining the idle queue (131) in the storage device, or in combination, a separate submission queue (e.g., 113) can be configured to submit idle time requests/commands, which may or may not use add-on modules (133). The firmware (104) is configured to cause the controller (107) to fetch, at an idle time, commands from the submission queue (e.g., 113) identified for idle time requests/commands. The idle time is identified after the other submission queues (e.g., 111, . . . ) and/or the idle queue (131) are empty, after the previously fetched requests/commands have been completed, and/or after the routine idle time tasks have been completed.

Typically, the add-on module (133) is programmed to run by the controller (107) of the storage device (103) using the data stored in the non-volatile storage media (109) without a need to communicate with the host (101) during the execution of the add-on module (133). The execution of a request/command in the idle queue (131) and/or a submission queue (e.g., 113) for idle time execution may use one or more modules in the firmware (104) and/or in the operating system running in one of the processors (121, . . . , 123). The processing result may be stored back in the non-volatile storage device (109) and/or reported to the host via a message placed in a completion queue (115, . . . , or 117).

In some instances, the host (105) may indicate that a command or request submitted via a submission queue (111, . . . , or 113) (e.g., for storing a data item at a logical address) has a low priority and/or has no latency requirements on completion. As a result, the storage device (103) places the command or request in the idle queue (131) for execution during an idle time. Preferably, during an idle time the storage device (103) analyzes the tasks, commands and requests to be performed and organizes their execution in a way that minimizes write amplification and thus improves the longevity of the storage device (103).

In general, low priority commands and tasks are processed in the background to avoid impact on the performance of high priority commands. Examples of low priority commands include a TRIM command, an UNMAP command, and/or a DEALLOCATE command, which can be used by the host (105) to identify a section of the storage device which has invalid data that can be erased. Further, customized commands defined by the add-on modules can be identified as low priority commands. Furthermore, certain write commands may be treated as low priority commands, such as random writes to non-sequential logical addresses that have great impact on write amplification.

After the processing of high priority commands, the storage device (103) may use computation resources and processing time to best accommodate the low priority tasks and commands and minimize write amplification.

For example, the host (101) may have some data that needs to be stored. Since there are no performance requirements in committing the data in the non-volatile storage media (109), the host (101) allows the storage device (103) to commit the data into the non-volatile storage media (109) at a time chosen by the storage device (103). The storage device (103) schedules the execution of writing the data in the non-volatile storage media (109) in a way that reduces write amplification and thus improves the longevity of the storage device (103).

In some instances, performing the low priority writes after housekeeping activities, such as garbage collection and wear leveling can reduce write amplification.

In some instances, the storage device (103) may perform further computations to combine writes and/or adjust the mapping of logical to physical address mapping to reduce write amplification.

For example, the storage device (103) may compute the total writes required to execute the write commands scheduled in the idle queue (131) according to one way to map logical addresses to physical addresses, and modify the address mapping in different ways to find a mapping that reduce the total writes for executing the write commands. An optimized address mapping can be computed to reduce and/or minimize the total writes for the execution of the write commands scheduled in the idle queue.

In some instances, when the content at a logical address to be written by one command is modified by a subsequent write command, the storage device may combine the writes and commit the final result in the non-volatile storage media (109) to reduce writes.

Figure 4:
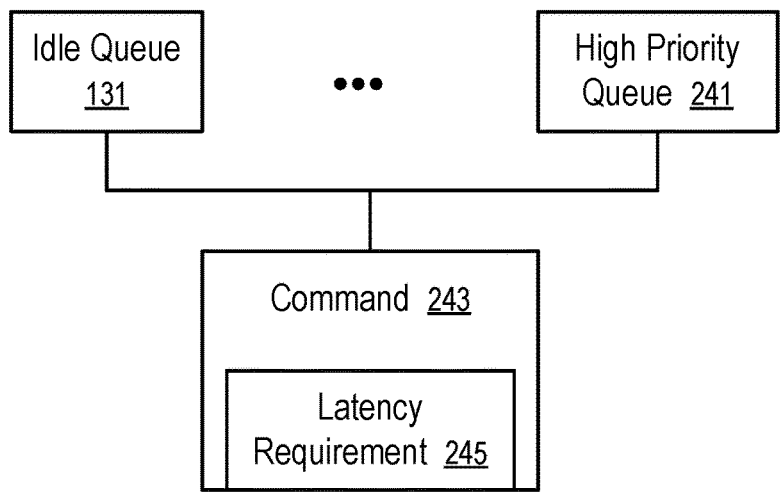
FIG. 4 illustrates scheduling the processing of a command according to a latency requirement of the command.

FIG. 4 illustrates scheduling the processing of a command according to a latency requirement of the command. For example, the scheduling of FIG. 4 can be used in the storage device (103) of the computer system illustrated in FIG. 1, with or without the add-on modules (133).

In FIG. 4, the storage device (103) has multiple command queues (e.g., 131, . . . , 241) for scheduling the execution of commands (e.g., 243) retrieved or received from the host (101).

The command queues (e.g., 131, . . . , 241) have different levels of processing priority. The idle queue (131) is used to buffer the commands that can be executed at an idle time. The storage device (103) is configured to process a higher priority queue (e.g., 241) and empty the high priority queue(s) (e.g., 241) before entering an idle state and then processing the commands in the idle queue (131).

A typical command (e.g., 243) may include a latency requirement (245). When the command (243) has a high requirement (245) in latency performance, the command (243) is to be executed within a short period of time and thus assigned to the high priority queue (241). When the command (243) has a low requirement (245) in latency performance, the command (243) can be executed after a long period of time and thus assigned to the idle queue (241) for execution during an idle time.

In some instances, the latency requirement (245) is specified via a priority level indicator or a quality of service indicator.

In some instances, the latency requirement (245) explicitly indicates that the command (243) can be performed at an idle time.

In some instances, the latency requirement (245) is determined from a characteristic of a data stream to be stored in the storage device (103), such as whether the data stream writes data sequentially or randomly, and the size of the data stream. For example, a large sequential data stream is to be assigned to a high priority queue (241); and a small random data stream can be assigned to the idle queue (131).

In some instances, the lack of a particular requirement in latency performance in completion of the command (243) can be determined from the type of the command (243). For example, a TRIM/UNMAP/DEALLOCATE command may be viewed as such a command that no particular requirement in latency performance allows the storage device (103) to schedule it in the idle queue (131).

Figure 5:
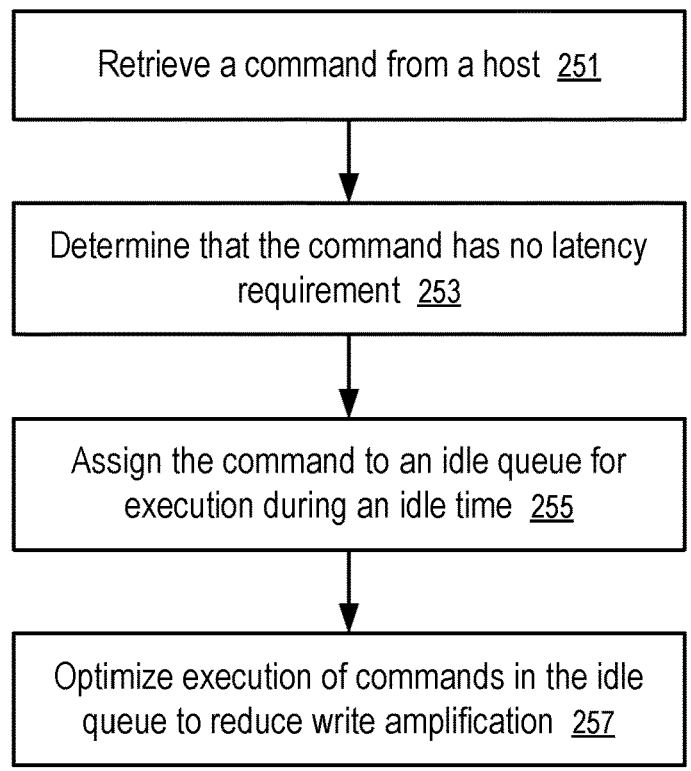
FIG. 5 shows a method to process a command at an idle time to reduce write amplification.

FIG. 5 shows a method to process a command at an idle time to reduce write amplification. For example, the method of FIG. 5 can be implemented in the storage device (103) of the computer system illustrated in FIG. 1, with or without the add-on modules (133), using a command scheduling approach illustrated in FIG. 4.

The method of FIG. 5 includes: retrieving (251) a command (243) from a host (101); determining (253) that the command (243) has no latency requirement; assigning (255) the command (243) to an idle queue (131) for execution during an idle time of the storage device (103); and optimizing (257) execution of commands (e.g., 243) in the idle queue (131) to reduce write amplification.

Figure 6:
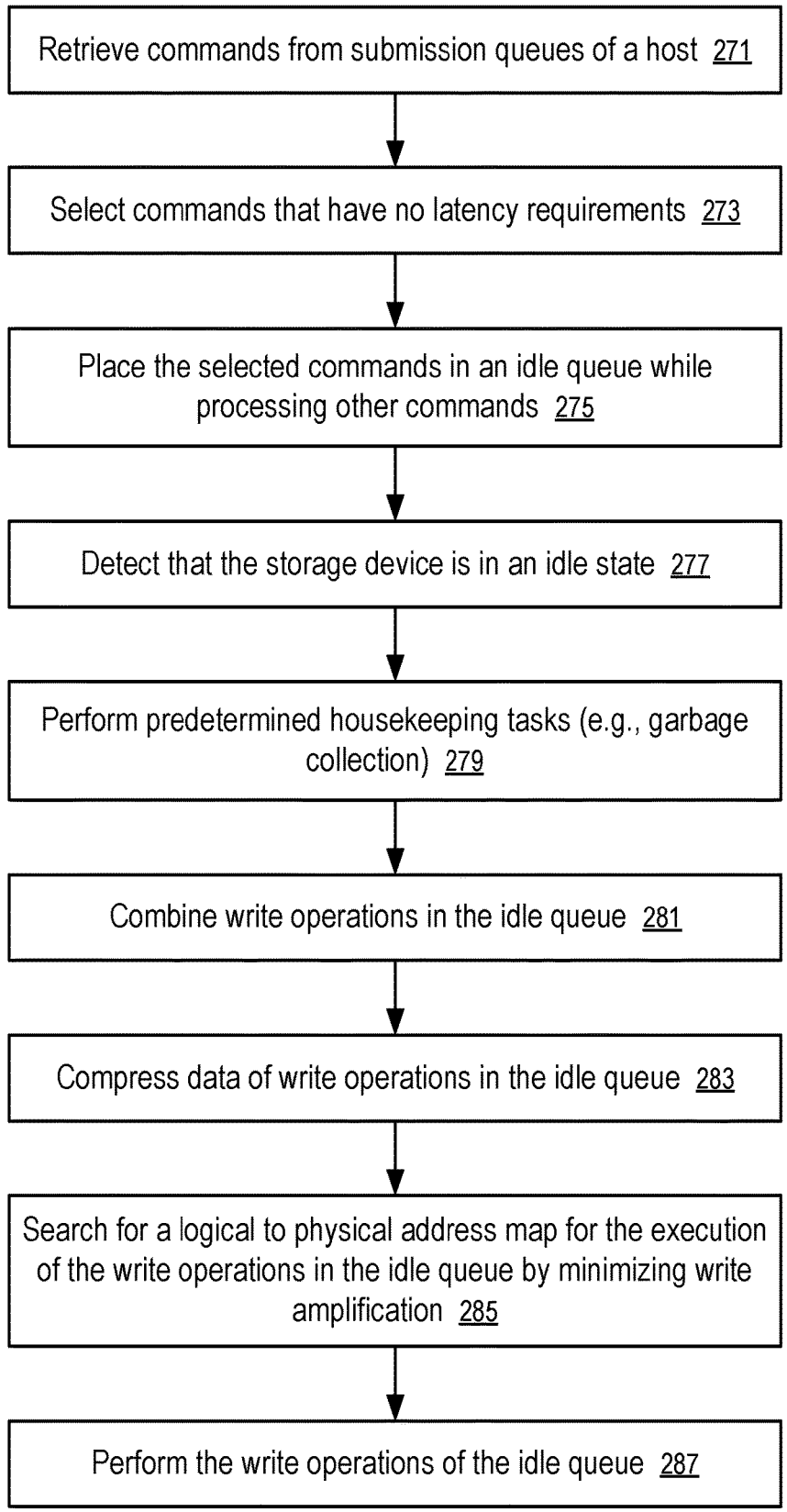
FIG. 6 shows a detailed method to reduce write amplification in idle time processing.

FIG. 6 shows a detailed method to reduce write amplification in idle time processing. For example, the method of FIG. 6 can be implemented in the storage device (103) of the computer system illustrated in FIG. 1, with or without the add-on modules (133), using a command scheduling approach illustrated in FIG. 4.

The method of FIG. 6 includes: retrieving (271) commands from submission queues (111, . . . , 113) of a host (101); selecting (273) commands (e.g., 243) that have no latency requirements (e.g., 245); and placing (275) the selected commands in an idle queue (131) while processing other commands.

For example, write commands that do not explicitly require their data to be committed in the non-volatile storage media (109) within a threshold period of time may be considered to have no latency requirements. Alternatively, the host (101) may explicitly label certain write commands as having no requirement to be committed in the non-volatile storage media (109) within a threshold period of time. In some instances, the host (101) may identify the required latency of low priority commands as a time period longer than a threshold to allow the storage device (103) to place the low priority commands in the idle queue (131).

In some instances, once a command is in the idle queue (131), the controller (107) may report the completion of the operation of the command via a completion queue (e.g., 115, . . . , or 117). When the host (101) subsequently requests to read data written via the write commands in the idle queue, the controller (107) retrieves the corresponding data from the idle queue (131). Further, when the host (101) subsequently requests to overwrite data written via the write commands in the idle queue, the controller (107) merges the respective commands to write the final result and thus avoids the intermediate write operation.

In other instances, after a command is scheduled in the idle queue (131), the controller (107) does not report the completion of the operation of the command until the command is dispatched from the idle queue (131) and executed.

The method of FIG. 6 further includes: detecting (277) that the storage device (103) is in an idle state; performing (279) predetermined housekeeping tasks (e.g., garbage collection); combining (281) write operations in the idle queue (131); compressing (283) data of write operations in the idle queue (131); searching (285) for a logical to physical address map for the execution of the write operations in the idle queue (131) by minimizing write amplification; and performing (287) the write operations of the idle queue (131).

For example, the controller (107) may compute the final data to be programmed/written/committed in the non-volatile storage media (109) by the commands in the idle queue (131) as a whole and plan the allocation of pages of memory units for the final data to be written to reduce movements of data items in the non-volatile storage media (109).

For example, the computation of the final data may eliminate the writing of intermediate data that is subsequently changed by a further command.

For example, planning of the allocations of pages of memory units for programming/writing the final data may be combined with the planning of the garbage collection to minimize writes and/or data movements in the non-volatile storage media (109).

For example, the controller (107) may optionally compress the data to be committed in the non-volatile storage media (109) to reduce write operations.

In some instances, the data written via the high priority queue (241) is not compressed to reduce latency for the execution of high priority commands; and the data written via the idle queue (131) is compressed to reduce latency for the execution of high priority commands.

In some instances, the data written via the high priority queue (241) is compressed using a fast compression technique to reduce latency for the execution of high priority commands; and the data written via the idle queue (131) is compressed using another compression technique that may be computational intensive but can achieve high compression ratio to reduce write operations.

For example, a storage device (103) includes a host interface (105), a controller (107), non-volatile storage media (109), and firmware (104) containing instructions executable by the controller (107) to perform operations of using idle time processing to reduce write amplification.

The storage device (103) receives, via the host interface (105), a plurality of commands from a host (101), using a peripheral component interconnect express bus in accordance with a non-volatile memory host controller interface specification.

The storage device (103) selects a subset of commands from the plurality of commands, and schedules, using an idle queue (131), the subset of commands for execution during an idle time. The idle time is reached after the submission queues (111, . . . , 113) on the host (101) and the high priority queue (e.g., 241) in the DRAM (106) of the storage device (103) are empty. During the idle time, the storage device (103) manages write amplification reducing in executing the subset of commands that are scheduled in the idle queue (131).

For example, the non-volatile storage media (109) includes flash memory; and the controller (107) performs garbage collection during the idle time. The garbage collection may be performed before the execution of the subset of commands in the idle queue (131), or in combination with the execution of the subset of commands in the idle queue (131), to reduce write amplification.

The controller (107) may select the commands for the idle queue (131) based on the latency requirements of the commands retrieved from the submission queues (111, . . . , 113) of the host (101) (or the lack of latency requirements).

For example, the subset of commands can be selected and scheduled in the idle queue (131) for execution during the idle time in response to the host (101) identifying that the selected commands have no requirement in latency performance in their completion.

Alternatively, or in combination, write commands are selected for the idle queue (131) based on an attribute of the write commands, such as the write commands storing data non-sequentially and/or randomly in an address space.

Alternatively, or in combination, write commands are selected for the idle queue (131) in response to the host specifying, for the write commands, a priority level that is lower than a threshold.

Alternatively, or in combination, write commands are selected for the idle queue (131) in response to the host specifying a quality of service level, for the commands, that is lower than a threshold.

At the idle time, the controller (107) uses computation resources and/or time to reduce write amplification via compressing data to be stored via the commands in the idle queue (131), via combining write operations in the commands in the queue (131), and/or via searching a logical to physical address map schedule for the execution of the commands in the idle queue (131).

A non-transitory computer storage medium can be used to store instructions of the firmware (104) and/or the add-on modules (133). When the instructions are executed by the controller (107) of the computer storage device (103), the instructions cause the controller (107) to perform a method discussed above.

In the present disclosure, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or microcontroller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A storage device, comprising:
  a host interface;
  a controller;
  non-volatile storage media; and
  firmware containing instructions executable by the controller to:
    receive, via the host interface, a plurality of commands from a host,
    select a subset of commands from the plurality of commands;
    schedule the subset for execution during an idle time; and
    reduce write amplification in executing the commands in the subset during the idle time;
  wherein the non-volatile storage media includes flash memory; and the controller performs garbage collection during the idle time;
  wherein the commands of the subset include write commands for storing data in the flash memory;

wherein the write commands in the subset are scheduled in a queue for execution during the idle time in response to the host specifying a quality of service level lower than a threshold for the commands of the subset.

2. The storage device of claim 1, wherein the write commands are executed after performing garbage collection.

3. The storage device of claim 1, wherein the write commands are executed in combination with garbage collection.

4. The storage device of claim 1, wherein the commands of the subset are scheduled in a queue for execution during the idle time in response to the host identifying that the commands of the subset have no requirement in latency performance in completion.

5. The storage device of claim 4, wherein the write commands are selected for the queue based on an attribute of the write commands.

6. The storage device of claim 5, wherein the attribute indicates that the write commands stores data non-sequentially in an address space.

7. The storage device of claim 1, wherein the write commands in the subset are scheduled in a queue for execution during the idle time in response to the host specifying a priority level lower than a threshold for the write commands.

8. The storage device of claim 1, wherein the controller reduces write amplification via compressing data to be stored via the commands in the subset.

9. The storage device of claim 1, wherein the controller reduces write amplification via combining write operations in the commands in the subset.

10. The storage device of claim 1, wherein the controller reduces write amplification via searching a logical to physical address map schedule for execution of the commands in the subset via minimizing write amplification.

11. The storage device of claim 1, wherein the host interface communicates with the host via a peripheral component interconnect express bus in accordance with a non-volatile memory host controller interface specification.

12. The storage device of claim 11, wherein the host has a plurality of submission queues to communicate requests to the storage device; and the storage device is determined to be in the idle state at least after the submission queues are empty.

13. A method implemented in a storage device, the method comprising:
receiving, via a host interface of the storage device, a plurality of commands from a host,
selecting, by a controller executing firmware, a subset of commands from the plurality of commands;
scheduling, by the controller, the subset for execution during an idle time; and
reducing, by the controller, write amplification in non-volatile storage media of the storage device in executing the commands in the subset during the idle time;
wherein reducing write amplification includes compressing data of the commands in the subset using a technique different from a compression technique used for commands executed at a non-idle time.

14. The method of claim 13, wherein reducing write amplification includes searching for a logical to physical address map to minimize write operations.

15. The method of claim 13, wherein reducing write amplification includes combining write operations of the commands in the subset.

16. A non-transitory computer storage medium storing instructions which, when executed by a storage device, cause the storage device to perform a method, the method comprising:
receiving, via a host interface of the storage device, a plurality of commands from a host,
selecting, by a controller executing firmware, a subset of commands from the plurality of commands;
scheduling, by the controller, the subset for execution during an idle time; and
reducing, by the controller, write amplification in non-volatile storage media of the storage device in executing the commands in the subset during the idle time;
wherein reducing write amplification includes compressing data of the commands in the subset using a technique different from a compression technique used for commands executed at a non-idle time.

* * * * *